（12） United States Patent
Mizuno et al.

(10) Patent No.: US 11,170,914 B2
(45) Date of Patent: Nov. 9, 2021

(54) FIXING MEMBER-ATTACHED WIRE HARNESS

(71) Applicants: AutoNetworks Technologies, Ltd., Mie (JP); Sumitomo Wiring Systems, Ltd., Mie (JP); Sumitomo Electric Industries, Ltd., Osaka (JP)

(72) Inventors: Housei Mizuno, Mie (JP); Hidetoshi Ishida, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/981,490

(22) PCT Filed: Aug. 10, 2018

(86) PCT No.: PCT/JP2018/030033
§ 371 (c)(1),
(2) Date: Sep. 16, 2020

(87) PCT Pub. No.: WO2019/187194
PCT Pub. Date: Oct. 3, 2019

(65) Prior Publication Data
US 2021/0035712 A1    Feb. 4, 2021

(30) Foreign Application Priority Data

Mar. 27, 2018 (JP) .............................. JP2018-059530

(51) Int. Cl.
*H01B 7/40* (2006.01)
*H01B 7/04* (2006.01)
(Continued)

(52) U.S. Cl.
CPC ............ *H01B 7/40* (2013.01); *B60R 16/0215* (2013.01); *H01B 7/0045* (2013.01); *H02G 3/30* (2013.01); *H01B 7/04* (2013.01)

(58) Field of Classification Search
CPC .... B60R 16/0215; H01B 7/40; H01B 7/0045; H01B 7/04; H02G 3/30
(Continued)

(56) References Cited

U.S. PATENT DOCUMENTS 3,384,958 A * 5/1968 Christian ............... H01R 4/026
29/829
6,019,271 A * 2/2000 Hayden ................ B23K 20/103
228/110.1
(Continued)

FOREIGN PATENT DOCUMENTS

JP    2012-239313    12/2012
JP    2013-38995    2/2013
(Continued)

OTHER PUBLICATIONS

International Search Report issued in International Patent Application No. PCT/JP2018/030033, dated Oct. 2, 2018, along with an English translation thereof.
(Continued)

*Primary Examiner* — Timothy J Thompson
*Assistant Examiner* — Michael F McAllister
(74) *Attorney, Agent, or Firm* — Greenblum & Bernstein, P.L.C.

(57) ABSTRACT

A fixing member-attached wire harness includes a wire harness having an electrical wire and a sheet material welded to an insulating covering of the electrical wire and a fixing member attached to the wire harness for fixing the wire harness to a vehicle. When bending force is applied to a terminal side region part of the wire harness in a state
(Continued)

where the fixing member is fixed to a fixed object a welding region part of the wire harness includes a first region part following a bending of the terminal side region part and a second region part linked to an opposite side of the first region part from the terminal side region part and prevented from following the bending of the terminal side region part by support force of the fixing member.

6 Claims, 5 Drawing Sheets

(51) Int. Cl.
    *H02G 3/30*     (2006.01)
    *B60R 16/02*     (2006.01)
    *H01B 7/00*     (2006.01)

(58) Field of Classification Search
    USPC .......................................................... 174/480
    See application file for complete search history.

(56) References Cited

U.S. PATENT DOCUMENTS

| | | | |
|---|---|---|---|
| 9,484,723 | B2 | 11/2016 | Doshita |
| 2002/0096358 | A1* | 7/2002 | Murakami ......... H01B 11/1091 |
| | | | 174/251 |
| 2015/0048221 | A1 | 2/2015 | Doushita et al. |

FOREIGN PATENT DOCUMENTS

| | | |
|---|---|---|
| JP | 2013-255410 | 12/2013 |
| JP | 2014-99994 | 5/2014 |
| JP | 2015-72798 | 4/2015 |

OTHER PUBLICATIONS

Written Opinion issued in International Patent Application No. PCT/JP2018/030033, dated Oct. 2, 2018, along with an English translation thereof.

* cited by examiner

FIXING MEMBER-ATTACHED WIRE HARNESS

TECHNICAL FIELD

The present invention relates to a technique of incorporating a wire harness into a vehicle.

BACKGROUND ART

Patent Document 1 discloses a technique, when a sheet-like exterior member is attached to electrical wires, for positioning the exterior member with respect to the electrical wires by winding a tape around each end portion of the exterior member and the electrical wires extending from the end portion.

PRIOR ART DOCUMENTS

Patent Documents

Patent Document 1: Japanese Patent Application Laid-Open No. 2015-72798

SUMMARY

Problem to be Solved by the Invention

Herein, the applicant of the present application proposes, as a new method of fixing the electrical wires and the sheet-like exterior member, a method of directly fixing an insulating covering of the electrical wires and a sheet material by welding.

As is a case in a wire harness 90 illustrated in FIG. 8, a fixing member 93 for fixing the wire harness 90 to the vehicle is considered to be provided on an end portion of a sheet material 92 in a case where an insulating covering of an electrical wire 91 and the sheet material 92 are directly welded and fixed to each other.

However, in this case, as illustrated in FIG. 9, when a terminal part 91a of the electrical wire 91 is bent in a direction away from the sheet material 92 in a state where the fixing member 93 is fixed to a vehicle 94, force according to the bending tends to act as force of separating the electrical wire 91 and the sheet material 92 by reason that the end portion of the sheet material 92 is fixed. Furthermore, when the terminal part 91a is pulled along an extension direction thereof from the state in FIG. 9 (an upper side in the example illustrated in FIG. 9), force according to the pulling tends to act as force of directly separating the electrical wire 91 and the sheet material 92. Accordingly, there is a possibility that the electrical wire 91 and the sheet material 92 are separated from each other.

Thus, an object of the present invention is to provide a technique capable of suppressing a separation of an electrical wire and a sheet material when a wire harness in which an insulating covering of the electrical wire and a sheet material are directly welded and fixed is incorporated into a vehicle.

Means to Solve the Problem

In order to solve the above problems, a fixing member-attached wire harness according to a first aspect includes: a wire harness including an electrical wire and a sheet material having at least one electrical wire fixing part welded to an insulating covering of the electrical wire disposed on a main surface, and including a welding region part where the electrical wire and the sheet material are welded and a terminal side region part located closer to a side of a terminal part in relation to the welding region part; and a fixing member attached to the wire harness and fixed to a vehicle, thereby fixing the wire harness to the vehicle, wherein when bending force is applied to the terminal side region part in a state where the fixing member is fixed to a fixed object, the welding region part includes a first region part following a bending of the terminal side region part and a second region part linked to an opposite side of the first region part from the terminal side region part and prevented from following the bending of the terminal side region part by support force of the fixing member.

A fixing member-attached wire harness according to a second embodiment is the fixing member-attached wire harness according to the first aspect, wherein when the electrical wire fixing parts in the first region part and the second region part in the sheet member are defined as a first electrical wire fixing part and a second electrical wire fixing part, respectively, and the fixing member is provided on a lateral extension part extending to a lateral side of the electrical wire from the second electrical wire fixing part or the second electrical wire fixing part in the sheet material.

A fixing member-attached wire harness according to a third embodiment is the fixing member-attached wire harness according to the first aspect, wherein when the electrical wire fixing parts in the first region part and the second region part in the sheet member are defined as a first electrical wire fixing part and a second electrical wire fixing part, respectively, the fixing member is provided on a front extension part extending to a front side from the second electrical wire fixing part in the sheet material.

A fixing member-attached wire harness according to a fourth embodiment is the fixing member-attached wire harness according to the third aspect, wherein the front extension part extends to be linked to a lateral side of the first electrical wire fixing part on a front side of a lateral extension part extending to a lateral side of the second electrical wire fixing part in the sheet material, and a perforated line is formed at a boundary between the front extension part and the first electrical wire fixing part.

A fixing member-attached wire harness according to a fifth embodiment is the fixing member-attached wire harness according to any one of the first to fourth aspects, wherein in the welding region part, a plurality of spot welding parts where the insulating covering and the sheet material are partially welded are formed at intervals along an extension direction the electrical wire.

A fixing member-attached wire harness according to a sixth embodiment is the fixing member-attached wire harness according to any one of the first to fourth aspects, wherein in the welding region part, the insulating covering and the sheet material are continuously welded along an extension direction of the electrical wire.

Effects of the Invention

According to each embodiment, in the case where the wire harness in which the insulating covering of the electrical wire and the sheet material are directly welded and fixed is incorporated into the vehicle, when the bending force is applied to the electrical wire in the state where the fixing member is fixed, the welding part of the sheet material is provided to be curved to follow the bending. Thus, the force of bending the electrical wire hardly acts as force of separating the electrical wire and the sheet material. Furthermore, even when the electrical wire is pulled in the state where the electrical wire and the sheet material are curved, the force according to the pulling tends to act as force of shearing the electrical wire and the sheet material, and hardly acts as force of separating the electrical wire and the sheet material. Accordingly, the separation of the electrical wire and the sheet material can be suppressed.

According to the second aspect, the electrical wire can be bent in a position of the fixing member.

According to the third aspect, the fixing member can be located in a position to offset the position where the electrical wire is bent.

According to the fourth aspect, the perforated line is split and the front extension part is separated from the first electrical wire fixing part, thus the first electrical wire fixing part can follow the bending of the electrical wire of the first region part.

According to the fifth aspect, a quality evaluation of each spot welding part can be easily performed.

According to the sixth aspect, a time for the welding can be reduced.

DESCRIPTION OF EMBODIMENT(S)

First Embodiment

Figure 1:
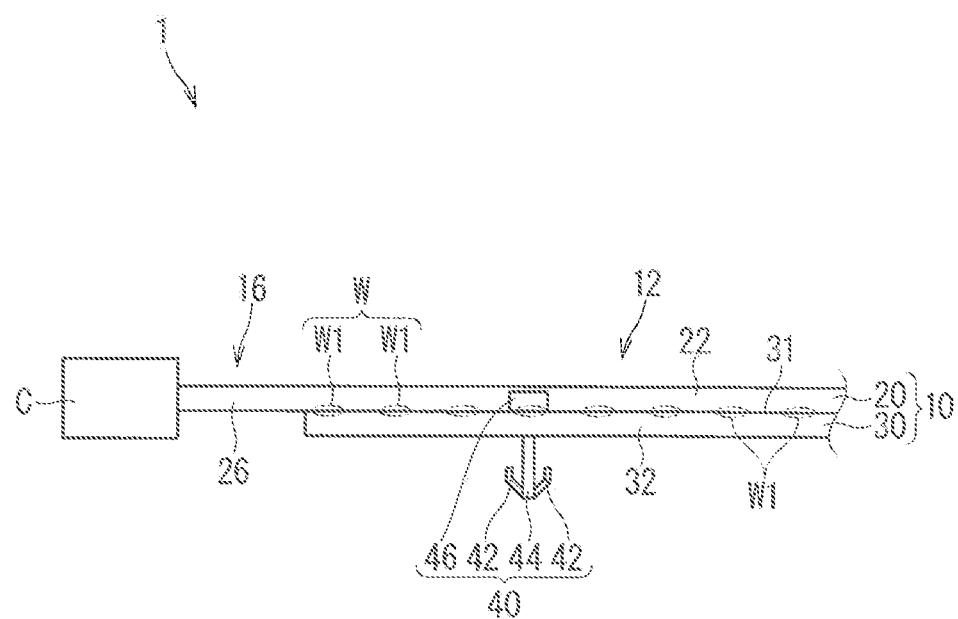
FIG. 1 A side view illustrating a fixing member-attached wire harness according to a first embodiment.
Figure 2:
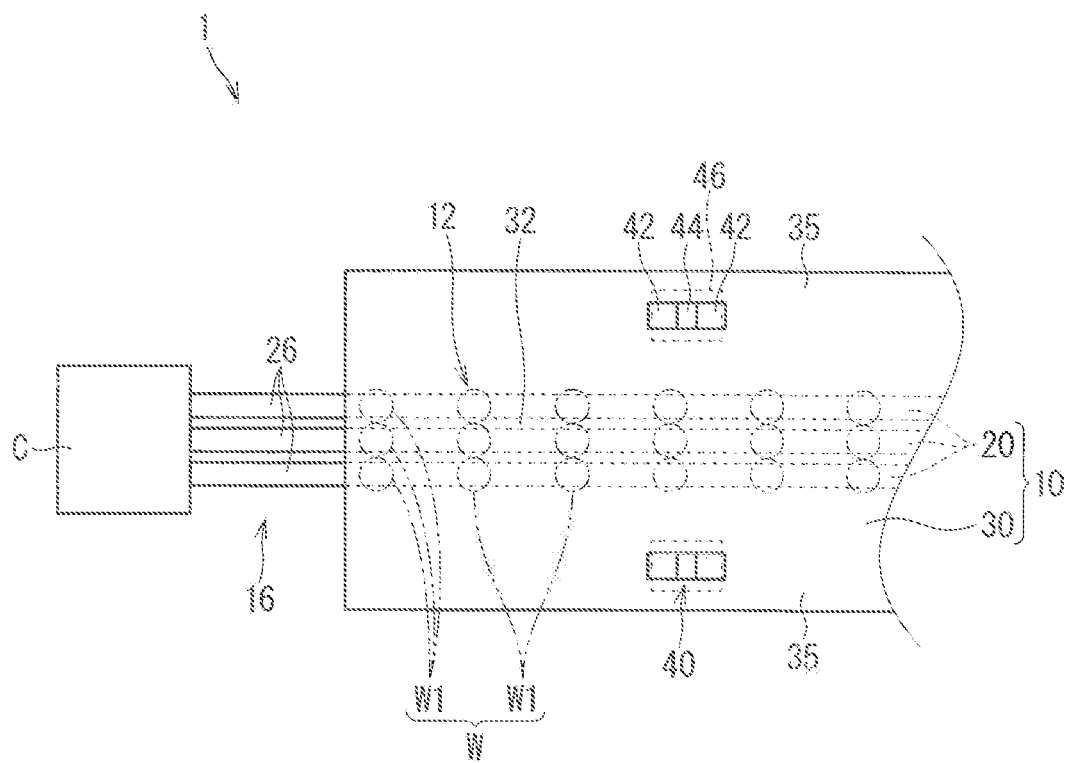
FIG. 2 A bottom view illustrating the fixing member-attached wire harness according to the first embodiment.

A fixing member-attached wire harness according to a first embodiment is described hereinafter. FIG. 1 is a side view illustrating a fixing member-attached wire harness 1 according to the first embodiment. FIG. 2 is a bottom view illustrating the fixing member-attached wire harness 1 according to the first embodiment.

The fixing member-attached wire harness 1 includes a wire harness 10 and a fixing member 40.

The wire harness 10 is used as a wire member mounted to a vehicle to electrically connect apparatuses to each other. The wire harness 10 includes an electrical wire 20 and a sheet material 30.

The electrical wire 20 is an insulated electrical wire including a core wire and an insulating covering for covering the core wire. The insulated electrical wire may be a so-called round wire or an angled wire.

The core wire includes one or a plurality of strands. Each strand is linearly formed of a conductive material such as copper, copper alloy, aluminum, and aluminum alloy, for example. When the core wire includes the plurality of strands, the plurality of strands are preferably stranded.

The insulating covering is formed by extrusion molding of a synthetic resin such as polyvinyl chloride (PVC) or polyethylene (PE) around the core wire or applying an insulation paint such as enamel, for example, around the core wire.

In the example illustrated in FIG. 1, a connector C is provided on a terminal part of the electrical wire 20. The electrical wire 20 is connected to an apparatus mounted to a vehicle via the connector C, for example. The connector C includes a connector housing formed of an insulating material, for example, and a terminal connected to an end portion of the electrical wire 20 and housed in the connector housing.

The sheet material 30 is a member having flexibility achieving a bending deformation. The electrical wire 20 is disposed on a main surface 31 of the sheet material 30. The sheet material 30 is welded to the insulating covering of the electrical wire 20 disposed on the main surface 31. A welding position W is illustrated by a dashed-two dotted line in each drawing. A welding means of welding the sheet material 30 and the insulating covering is not particularly limited, but is considered ultrasonic welding, for example. A material constituting the sheet material 30 is not particularly limited as long as it can be welded to the insulating covering. Preferable is a material including resin such as polypropylene (PP) and polyethylene terephthalate (PET) other than PVC and PE described above, and more preferable is a material including the same resin as that constituting the insulating covering.

The sheet material 30 is considered to be formed by extrusion molding and have a uniform cross-sectional shape, for example. The sheet material 30 is also considered a non-woven cloth or a foamed sheet, for example.

In the example illustrated in FIG. 1, the sheet material 30 is made up of one layer. Obviously, it is also considered that the sheet material 30 is made up of two or more layers. When the sheet material 30 is made up of the two-or more layers, a first layer including the main surface 31 described above is a wire fixing layer to which the electrical wire 20 is welded, and the other layer is appropriately selected in consideration of the function of the sheet material 30.

Herein, the three electrical wires 20 is disposed on the sheet material 30, however, the number of the electrical wires 20 may be one or two, or may also be four or more. A route of the electrical wire 20 disposed on the sheet material 30 is not particularly limited. For example, the electrical wire 20 may extend linearly on the sheet material 30 or may also be curved. When the plurality of electrical wires 20 are disposed on one sheet material 30, there may be a case where the plurality of electrical wires 20 all extend in the same direction or partially extend in a different direction. There may also be a case where a branching part where the plurality of electrical wires 20 branch off is formed on the sheet material 30.

In the present specification, a region in the wire harness 10 where the electrical wire 20 and the sheet material 30 are welded is referred to as a welding region part 12. A part located closer to a side of the terminal part (the connector C herein) in relation to the welding region part 12 is referred to as a terminal side region part 16. In the similar manner, a region in the electrical wire 20 welded to the sheet material 30 is referred to as a welding part 22 and a part located closer to a side of the terminal part (the connector C herein) in relation to the welding part 22 is referred to as a terminal side part 26. A region in the sheet material 30 welded to the electrical wire 20 is referred to as an electrical wire fixing part 32.

The welding region part 12 is a part including the welding part 22 of the electrical wire 20 and the electrical wire fixing part 32 of the sheet material 30. In the welding region part 12, a plurality of spot welding parts W1 where the insulating covering and the sheet material 30 are partially welded are formed at intervals along an extension direction the electrical wire 20 herein. In the example illustrated in FIG. 1, the spot welding part W1 is formed at a certain pitch, however, there may be a part with a different pitch.

The terminal side region part 16 is a part where the electrical wire 20 and the sheet material 30 are not welded herein. Particularly herein, the terminal side region part 16 is a part made up of the terminal side part 26 extending from an end portion of the sheet material 30 to an outer side and the connector C which is the terminal part in the electrical wire 20, and does not include the sheet material 30. There may also be a case where the sheet material 30 is included in the terminal side region part 16 such as a case where the end portion of the sheet material 30 is not welded to the electrical wire 20. There may also be a case where a base material of a sheet material which is not connected to a base material of the sheet material 30 constituting the welding region part 12 is welded to the terminal side part 26. Accordingly, the terminal side region part 16 is a part which does not include a sheet material connected to the sheet material 30 constituting the welding region part 12, or a part including a sheet material which is connected to the sheet material 30 but is not welded to the electrical wire 20.

Herein, the terminal side part 26 of the electrical wire 20 is not welded to the sheet material 30. Thus, the plurality of terminal side parts 26 of the electrical wires 20 do not interfere with each other before connected to the connector C. This terminal side part 26 is used for inserting a terminal provided on the end portion of the electrical wire 20 into a cavity formed in a connector housing, for example.

The fixing member 40 is a member for fixing the wire harness 10 to a vehicle. A fixing member 40 is attached to the wire harness 10. When the fixing member 40 is fixed to the vehicle, the wire harness 10 is fixed to the vehicle. Herein, the fixing member 40 is provided on the sheet material 30. More specifically, the fixing member 40 is provided on a lateral extension part 35 of the sheet material 30 extending on a lateral side of the electrical wire 20. Adopted as the fixing member 40 herein is a locking member 40 which can be inserted into and locked to a hole formed in a fixed object.

The locking member 40 includes a locking piece 42 which can be inserted into and locked to a hole formed in a fixed object such as a vehicle body panel, a column part 44 extending from the locking piece 42, and a retainer part 46 provided on a tip of the column part 44.

For example, the pair of locking pieces 42 are formed to extend from the tip of the column part 44 to both lateral sides, and are formed larger than a hole formed in the fixed object. The pair of locking pieces 42 are elastically deformed to be closed when being inserted into the hole formed in the fixed object, thereby being able to pass through the hole, and is elastically restored after passing through the hole, thereby being caught on a peripheral edge of the hole and being able to be locked thereto.

The column 44 is a part connecting the locking piece 42 and the retainer part 46. Herein, the column part 44 passes through the sheet material 30.

The retainer part 46 prevents the locking member 40 from coming out of the sheet material 30. The retainer part 46 is formed into a plate-like shape larger than a cross-sectional surface of the column part 44, and is located on an opposite side of the sheet material 30 from the locking piece 42, for example.

It is not necessary to use the locking member 40 as the fixing member 40, however, a member other than the locking member 40 may also be used. For example, a bolt or a double-sided adhesive tape, for example, is considered to be used as the fixing member. Even in the case where the locking member is used as the fixing member, a shape and a method of fixing the member to the sheet material is not limited thereto described above. For example, the locking piece is considered to be formed into an umbrella shape. For example, it is also considered that the column part does not pass through the sheet material 30 but a bottom surface of the retainer part is bonded to the sheet material 30.

The wire harness 10 is fixed by the fixing member 40 in a state where a main surface opposite to the main surface 31 where the electrical wire 20 is disposed faces the fixed object herein. Thus, the locking piece 42 in the locking member 40 is located on a side of the main surface opposite to the main surface 31 where the electrical wire 20 is disposed.

Figure 8:
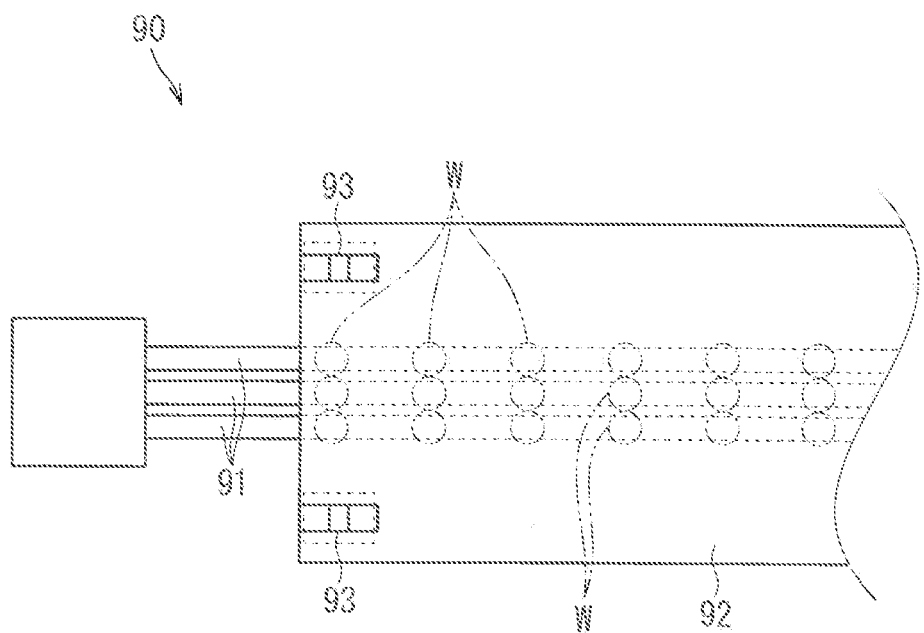
FIG. 8 A bottom view illustrating a fixing member-attached wire harness according to a conventional example.
Figure 9:
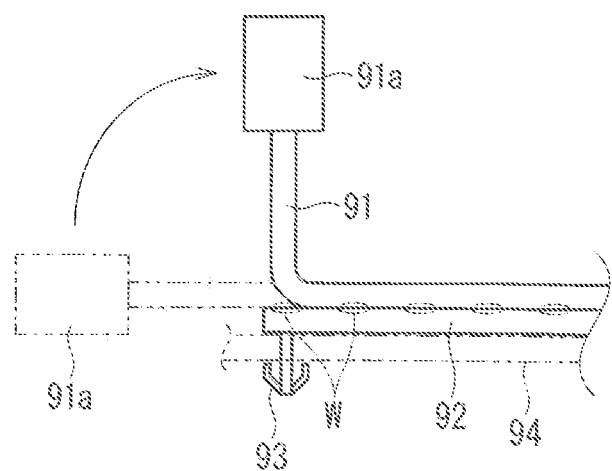
FIG. 9 An explanation view illustrating an operation at a time of bending a terminal part in a state where a fixing member is fixed in the fixing member-attached wire harness according to the conventional example.

In the case where the wire harness 10 includes the terminal side region part 16 described above and the fixing member 40 is provided near an end portion of the welding position W in the sheet material 30 welded to the electrical wire 20 as the example illustrated in FIG. 8 described above, when bending force is applied to the terminal side region part 16, it tends to act as force of separating the electrical wire 20 and the sheet material 30.

In contrast, herein, a position of the fixing member 40 with respect to the welding region part 12 is changed compared with the example illustrated in FIG. 8, thus when the bending force acts on the electrical wire 20, the electrical wire 20 and the sheet material 30 are hardly separated from each other. This configuration is described in detail with reference to FIG. 3 in addition to FIG. 1 and FIG. 2.

Figure 3:
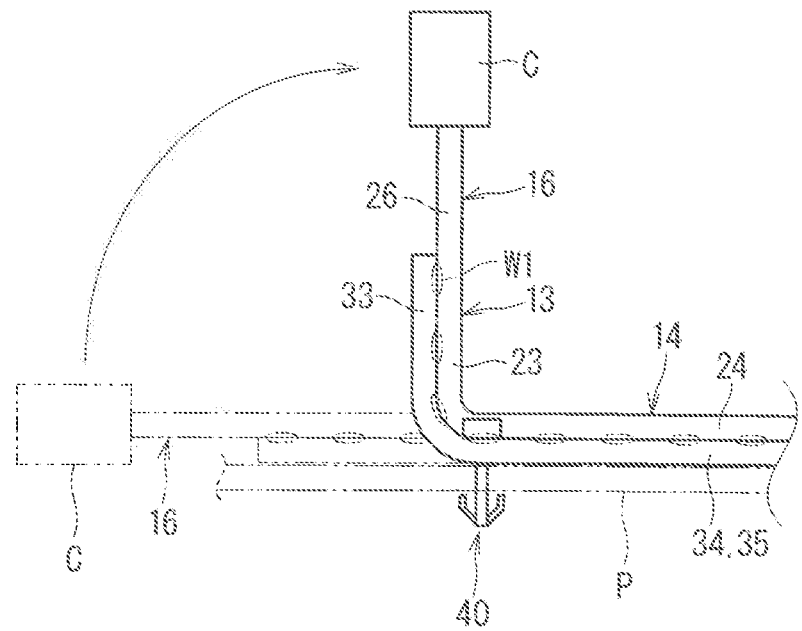
FIG. 3 An explanation view illustrating an operation at a time of bending the fixing member-attached wire harness according to the first embodiment.

FIG. 3 is an explanation view illustrating an operation at a time of bending the fixing member-attached wire harness 1 according to the first embodiment. Described hereinafter is an operation when the bending force is applied to the terminal side region part 16 in a state where the fixing member 40 is fixed to a fixed object P (referred to as a fixing state hereinafter). As illustrated in FIG. 3, in the description herein, the connector C is pulled to be moved to an upper side with respect to the fixed object P of the fixing member 40, thus the bending force is applied to the terminal side region part 16. Such an operation may occur when the connector C is pulled in a state where the fixing member 40 is fixed for a purpose of connecting the connector C, for example, at a time of incorporating the wire harness 10 into the vehicle.

As illustrated in FIG. 3, when the connector C is pulled and the terminal side region part 16 is bent, a first region part 13 of the welding region part 12 of the wire harness 10 linked to the terminal side region part 16 is bent to follow the terminal side region part 16. In the meanwhile, a second region part 14 of the welding region part 12 of the wire harness 10 linked to an opposite side of the first region part 13 from the terminal side region part 16 is prevented from following the bending of the terminal side region part 16.

This is caused by the configuration that the fixing member 40 is provided on the lateral extension part 35 of the sheet material 30.

More specifically, a part of the welding part 22 of the electrical wire 20 constituting the first region part 13 is defined as a first part 23, and a part constituting the second region part 14 is defined as a second part 24. In the similar manner, a part of the electrical wire fixing part 32 of the sheet material 30 constituting the first region part 13 is defined as a first electrical wire fixing part 33, and a part constituting the second region part 14 is defined as a second electrical wire fixing part 34. The first electrical wire fixing part 33 is a part where the first part 23 of the electrical wire 20 is welded, and the second electrical wire fixing part 34 is a part where the second part 24 of the electrical wire 20 is welded.

At this time, the lateral extension part 35 described above of the sheet material 30 where the fixing member 40 is provided is a part extending to a lateral side of the electrical wire 20 from the second electrical wire fixing part 34. Herein, the lateral extension parts 35 are provided on both lateral sides of the electrical wire 20 from the second electrical wire fixing part 34. The fixing member 40 is provided on each lateral extension part 35.

The first electrical wire fixing part 33 of the sheet material 30 is a free end in a state where the fixing member 40 is fixed. Thus, a part of the wire harness 10 located closer to the side of the connector C in relation to the first region part 13 is a free end. Accordingly, when the connector C is pulled as illustrated in FIG. 3 and the bending force is applied, the terminal side part 26 and the first part 23 of the electrical wire 20 follow the bending. Then, the first electrical wire fixing part 33 of the sheet material 30 also follows the first part 23 of the electrical wire 20. Accordingly, the first region part 13 follows the bending of the terminal side region part 16.

The second electrical wire fixing part 34 tends to remain in the same position by support force of the fixing member 40 provided on the lateral extension part 35 extending to the lateral side of the second electrical wire fixing part 34. The sheet material 30 is curved in a position between the first electrical wire fixing part 33 and the second electrical wire fixing part 34 so that the main surface 31 of the first electrical wire fixing part 33 crosses the main surface 31 of the second electrical wire fixing part 34. At this time, the second part 24 of the electrical wire 20 is fixed to the second electrical wire fixing part 34, thus the second part 24 of the electrical wire 20 also tends to remain in the same position. Accordingly, the second region part 14 is prevented from following the bending of the terminal side region part 16 by the support force of the fixing member 40.

Accordingly, when the bending force is applied to the terminal side region part 16, the first region part 13 follows the bending of the terminal side region part 16. In contrast, the second region part 14 is prevented from following the bending of the terminal side region part 16 by the support force of the fixing member 40. In other words, the position of the fixing member 40 with respect to the welding region part 12 is set so that a part of the welding region part 12 where the electrical wire 20 and the sheet material 30 are welded can follow the bending of the terminal side region part 16. Herein, the first region part 13 includes the three spot welding parts W, however, the number of the spot welding parts W1 is not limited thereto. The number of the spot welding parts W1 may be one or two, or may also be four or more. As the number thereof increases, the electrical wire 20 and the sheet material 30 are more hardly separated when the wire harness 10 is bent.

According to the fixing member-attached wire harness 1 having the configuration described above, in the case where the wire harness 10 in which the insulating covering of the electrical wire 20 and the sheet material 30 are directly welded and fixed is incorporated into the vehicle, when the force of bending the terminal side region part 16 is applied in the state where the fixing member 40 is fixed, the welding region part 12 is provided to be curved to follow the bending. Thus, the force of bending the terminal side region part 16 hardly acts as the force of separating the electrical wire 20 and the sheet material 30. Furthermore, even when the terminal side region part 16 is pulled in the state where the welding region part 12 is curved, the force according to the pulling tends to act as force of shearing the electrical wire 20 and the sheet material 30, and hardly acts as force of separating the electrical wire 20 and the sheet material 30. Accordingly, the separation of the electrical wire 20 and the sheet material 30 can be suppressed.

The fixing member 40 is provided on the lateral extension part 35 extending to the lateral side of the electrical wire 20 from the second electrical wire fixing part 34 in the sheet material 30, thus the electrical wire 20 can be bent in the position of the fixing member 40.

The plurality of spot welding parts W1 are formed at intervals along the extension direction of the electrical wire 20, thus a quality evaluation of each spot welding part W1 can be easily performed. More specifically, when the welding part is formed, welding conditions such as an output of a welding machine and a welding time is generally set. At this time, when the spot welding part W1 is formed, the welding conditions in each position can be easily managed and an error can be reduced, for example, compared with a case of continuously forming the welding region part 12. Thus, the quality evaluation of each spot welding part W1 can be easily performed.

Figure 4:
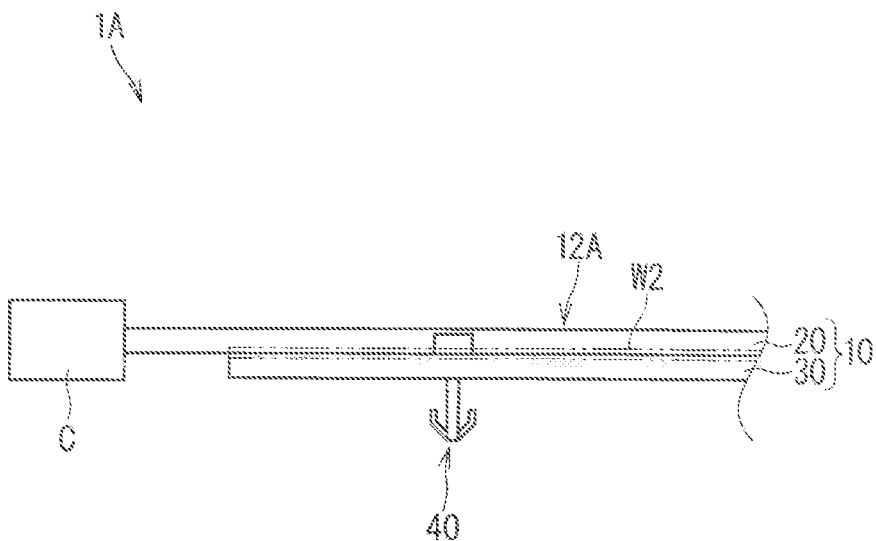
FIG. 4 A side view illustrating a modification example of the fixing member-attached wire harness according to the first embodiment.

Obviously, it is also considered that the insulating covering and the sheet material 30 are continuously welded along the extension direction of the electrical wire 20 without forming the spot welding part W1. That is to say, it is also considered that a continuous welding part W2 continuously welded in a welding region part 12A is formed as is a case in a fixing member-attached wire harness 1A according to a modification example illustrated in FIG. 4. Herein, when the welding part is formed, an operation of sandwiching a part to be welded by a welding machine and subsequently welding and releasing the part to be welded is needed. Herein, when the plurality of spot welding parts W1 are formed, the operation of sandwiching the part to be welded by the welding machine and the operation of releasing it need to be repeated. In contrast, when a continuous welding part W2 is formed in the welding region part 12A as described above, the operation of sandwiching the part to be welded by the welding machine and the operation of releasing it need not to be repeated several times compared with the case where the spot welding part W1 is formed, thus a time for the welding can be reduced.

Second Embodiment

Figure 5:
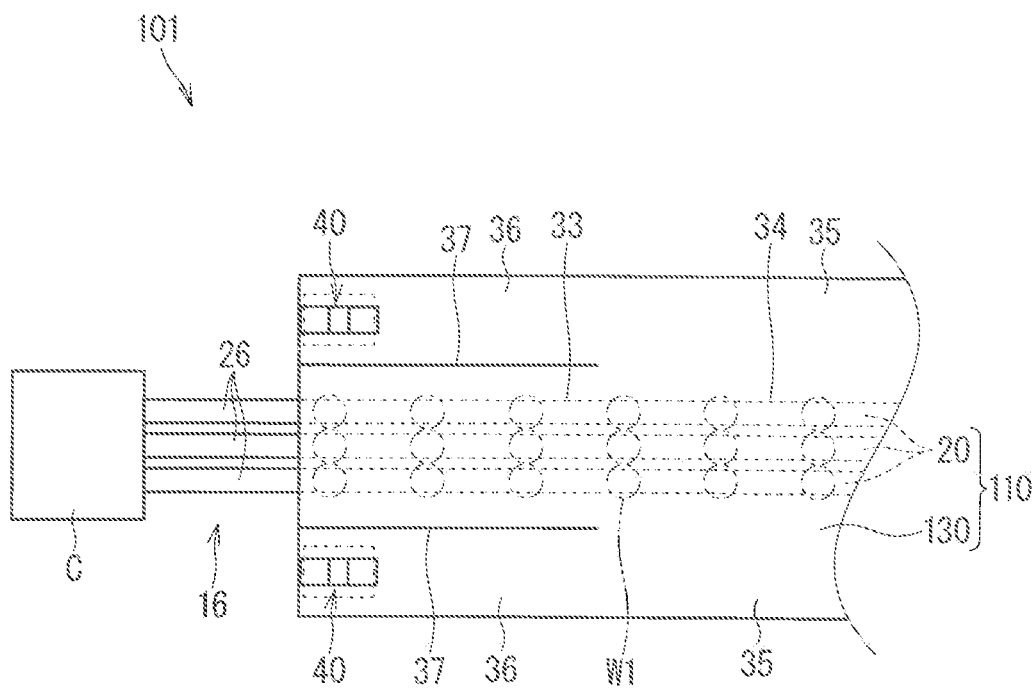
FIG. 5 A bottom view illustrating a fixing member-attached wire harness according to a second embodiment.

A fixing member-attached wire harness according to a second embodiment is described. FIG. 5 is a bottom view illustrating a fixing member-attached wire harness 101 according to the second embodiment. In the description of the present embodiment, the same reference numerals are assigned to the similar constituent elements described above, and the description thereof will be omitted.

In the fixing member-attached wire harness 101 according to the second embodiment, the position of the fixing member 40 and the shape of the sheet material 130 are different from the position of the fixing member 40 and the shape of the sheet material 30 in the fixing member-attached wire harness 1 according to the first embodiment.

The fixing member 40 is provided on a front extension part 36 extending to a front side of the second part 24 of the electrical wire 20 from the second electrical wire fixing part 34 in the sheet material 30. Herein, the front extension part 36 extends to be linked to a front side of the lateral extension part 35 extending to the lateral side of the second electrical wire fixing part 34. The front extension part 36 is located on a lateral side of the first electrical wire fixing part 33. At this time, a slit 37 is formed at a boundary between the front extension part 36 and the first electrical wire fixing part 33. That is to say, the front extension part 36 and the first electrical wire fixing part 33 have a shape in which one base material constituting the sheet material 130 is divided by the slit 37. More specifically, the electrical wire 20 is fixed to a middle portion of one base material constituting the sheet material 130 in the width direction and the slit 37 is formed on both lateral sides of the electrical wire 20 from an end edge portion to the middle portion of the base material in a longitudinal direction, thus the first electrical wire fixing part 33, the second electrical wire fixing part 34, the lateral extension part 35, and the front extension part 36 are formed in one base material.

Figure 6:
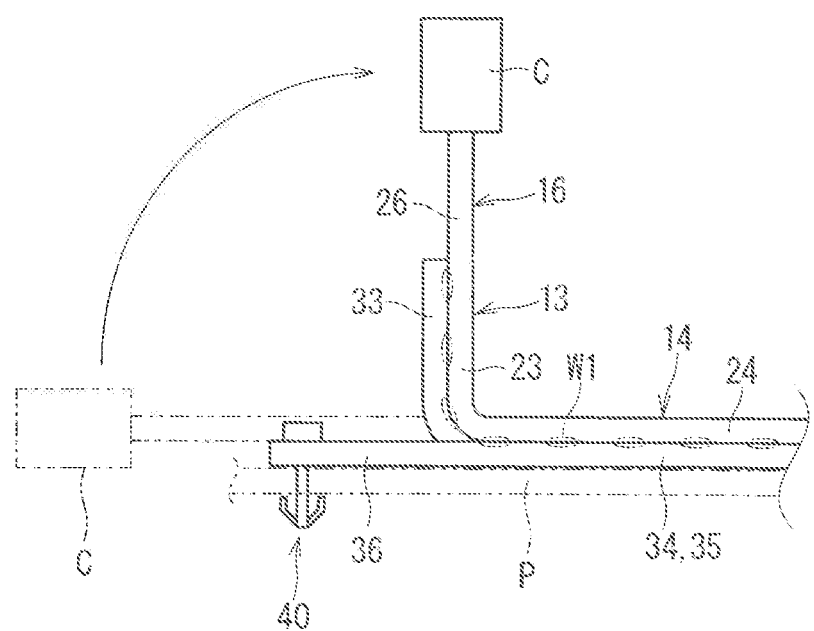
FIG. 6 An explanation view illustrating an operation at a time of bending the fixing member-attached wire harness according to the second embodiment.

At this time, the position of the fixing member 40 is also considered to be the same position as that in the conventional example illustrated in FIG. 8. However, herein, the shape of the sheet material 130 is changed from the sheet material in the conventional example illustrated in FIG. 8, thus the separation of the electrical wire 20 and the sheet material 30 hardly occurs when the bending force is applied to the terminal side region part 16. This configuration is described in detail with reference to FIG. 6 in addition to FIG. 5. FIG. 6 is an explanation view illustrating an operation at a time of bending the fixing member-attached wire harness 101 according to the second embodiment.

As illustrated in FIG. 6, when the connector C is pulled in the manner similar to the case in the first embodiment and the terminal side region part 16 is bent, the first region part 13 linked to the terminal side region part 16 in the welding region part 12 of the wire harness 110 is curved to follow the terminal side region part 16. In the meanwhile, a second region part 14 of the welding region part 12 of the wire harness 110 linked to an opposite side of the first region part 13 from the terminal side region part 16 is prevented from following the bending of the terminal side region part 16. This is caused by the configuration that the fixing member 40 is provided on the front extension part 36 of the sheet material 130 divided from the first electrical wire fixing part 33 by the slit 37.

More specifically, the first electrical wire fixing part 33 in the sheet material 130 is divided from the front extension part 36 by the slit 37 in the state where the fixing member 40 provided on the front extension part 36 is fixed to the fixed object P thus the first electrical wire fixing part 33 is a free end in relation to the second electrical wire fixing part 34. Thus, a part of the wire harness 110 located closer to the side of the connector C in relation to the first region part 13 is a free end. Accordingly, when the connector C is pulled and the bending force is applied, the terminal side part 26 and the first part 23 of the electrical wire 20 follow the bending. Then, the first electrical wire fixing part 33 of the sheet material 30 also follows the first part 23 of the electrical wire 20. Accordingly, the first region part 13 follows the bending of the terminal side region part 16.

The second electrical wire fixing part 34 tends to remain in the same position by support force of the fixing member 40 provided on the front extension part 36 extending to the front side of the second electrical wire fixing part 34 via the lateral extension part 35. At this time, the sheet material 30 is curved so that the main surface 31 of the first electrical wire fixing part 33 crosses the main surface 31 of the second electrical wire fixing part 34. The second part 24 of the electrical wire 20 is fixed to the second electrical wire fixing part 34, thus the second part 24 of the electrical wire 20 also tends to remain in the same position. Accordingly, the second region part 14 is prevented from following the bending of the terminal side region part 16 by the support force of the fixing member 40.

Also according to the fixing member-attached wire harness 1 having the configuration described above, when the bending force is applied to the terminal side region part 16, the first region part 13 follows the bending of the terminal side region part 16. In contrast, the second region part 14 is prevented from following the bending of the terminal side region part 16 by the support force of the fixing member 40. In other words, the shape of the sheet material 130 and the position of the fixing member 40 are set so that a part of the welding region part 12 where the electrical wire 20 and the sheet material 130 are welded can follow the bending of the terminal side region part 16.

According to the fixing member-attached wire harness 101, the fixing member 40 can be located in a position to offset the position where the electrical wire 20 is bent. Accordingly, a freedom degree of the position of the fixing member 40 is increased.

The slit 37 is formed in the sheet material 130, thus the first electrical wire fixing part 33, the second electrical wire fixing part 34, and the front extension part 36 can be formed in one base material constituting the sheet material 130.

Herein, the slit 37 described above needs to be located when the fixing member-attached wire harness 101 is bent in the state where the fixing member 40 is fixed. In other words, after manufacturing the fixing member-attached wire harness 1, the slit 37 needs not be formed until the fixing member-attached wire harness 101 is bent in the state where the fixing member 40 is fixed. In this case, there may also be a case where the slit 37 is unnecessary until reaching an assembly plant of the vehicle. However, it takes a trouble to form the slit 37 in the assembly plant of the vehicle in a state where the slit 37 is not formed at all. Thus, as is a case in the example illustrated in FIG. 7, a perforated line 38 is also considered to be formed in place of the slit 37.

Figure 7:
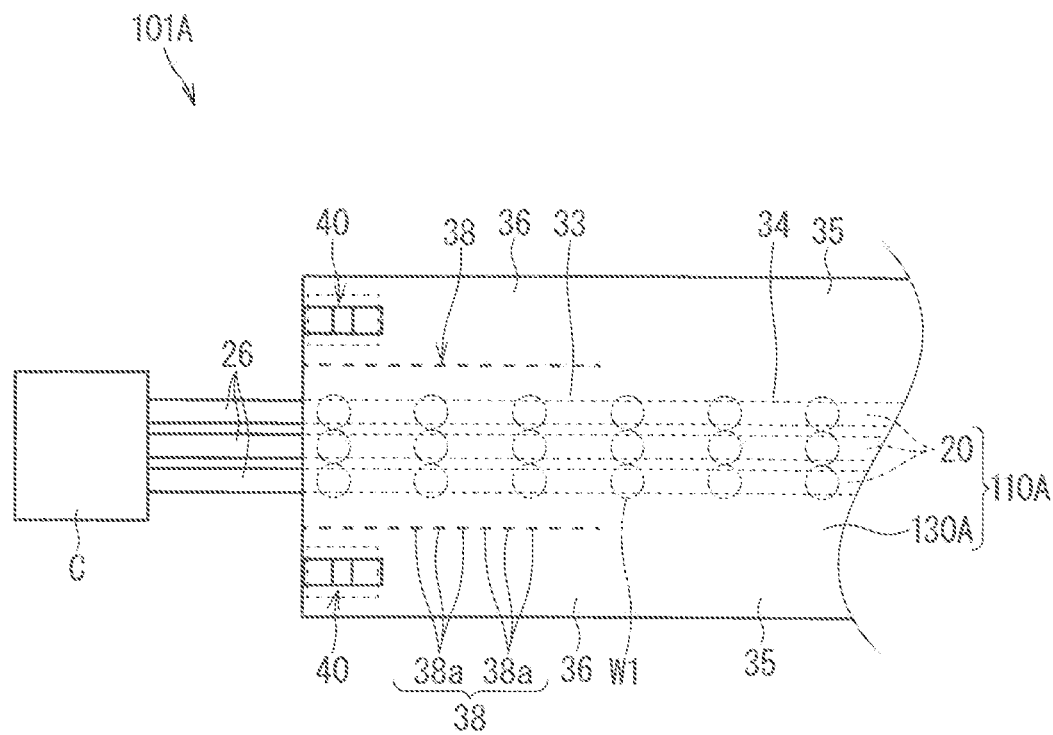
FIG. 7 A bottom view illustrating a modification example of the fixing member-attached wire harness according to the second embodiment.

In a sheet material 130A of a fixing member-attached wire harness 101A according to a modification example illustrated in FIG. 7, the perforated line 38 is formed in place of the slit 37 in the position of the slit 37 in the sheet material 130 described above. In this case, the fixing member-attached wire harness 101 is transported to the assembly plant of the vehicle and the perforated line 38 is split before or at a time of incorporating a wire harness 110A into the vehicle, thus the slit 37 is formed in a part of the perforated line 38.

In the perforated line 38, a plurality of small slits 38a are formed at intervals. Shape of the perforated line 38, for example, a size and interval of the small slit 38a is not particularly limited. For example, the perforated line 38 is considered to be formed into a shape corresponding to a timing of when the perforated line 38 is split. That is to say, the perforated line 38 may be formed to be split by the bending force at the time of bending the wire harness 110A or a process of splitting the perforated line 38 before the bending process may be provided. In the former case, it is preferable that the perforated line 38 is formed so that the force of splitting the perforated line 38 is smaller than the force of separating the electrical wire 20 and the sheet material 130A. In the latter case, for example, it is preferable to form the perforated line 38 to which hand-cutting properties are given so that a worker can split the sheet material with his/her hand.

Also according to such a fixing member-attached wire harness 101A, the perforated line 38 is split to form the slit 37, thus the front extension part 36 is cut and separated from the first electrical wire fixing part 33, and the first region part 13 can follow the bending of the terminal side region part 16. In contrast, the second region part 14 is prevented from following the bending of the terminal side region part 16 by the support force of the fixing member 40. According to the fixing member-attached wire harness 101A, the movement of the first region part 13 can be regulated until the perforated line 38 is split.

Modification Example

In the description of the first embodiment, the fixing member 40 is provided on the lateral extension part 35, however, this configuration is not necessary. For example, the fixing member 40 is also considered to be provided on the second electrical wire fixing part 34. In this case, for example, the fixing member 40 is considered to be provided between the electrical wire 20 and the electrical wire 20 in the second electrical wire fixing part 34.

Also when the fixing member 40 is provided on the lateral extension part 35, it is not necessary to form the lateral extension part 35 by the same sheet material 30 as the second electrical wire fixing part 34. For example, it is also considered that the base material of the sheet material constituting the lateral extension part 35 is a body different from the base material of the sheet material constituting the second electrical wire fixing part 34, and they are joined to each other.

In the description of the second embodiment, the fixing member 40 is provided on the front extension part 36 linked to the front side of the lateral extension part 35, however, this configuration is not necessary. For example, it is also considered that a base material of a sheet material different from the base material of the sheet material constituting the electrical wire fixing part 32 is joined to the second electrical wire fixing part 34, and the fixing member 40 is provided on a front extension part provided to extend to a front side from the second electrical wire fixing part 34.

The configurations described in the embodiments and modification examples thereof can be appropriately combined as long as they are not contradictory. For example, in the example illustrated in the second embodiment, the spot welding part W1 is formed, however, the continuous welding part W2 described in the first embodiment may be formed in place of the spot welding part W1.

Although the present invention is described in detail, the foregoing description is in all aspects illustrative and does not restrict the invention. It is therefore understood that numerous modifications and variations can be devised without departing from the scope of the invention.

EXPLANATION OF REFERENCE SIGNS 1 fixing member-attached wire harness
10 wire harness
12 welding region part
13 first region part
14 second region part
16 terminal side region part
20 electrical wire
22 welding part
23 first part
24 second part
26 terminal side part
30 sheet material
31 main surface
32 electrical wire fixing part
33 first electrical wire fixing part
34 second electrical wire fixing part
35 lateral extension part
36 front extension part
37 slit
38 perforated line
40 locking member (fixing member)
42 locking piece
44 column part
46 retainer part
C connector
W1 spot welding part
W2 continuous welding part

The invention claimed is:

1. A fixing member-attached wire harness, comprising:
    a wire harness including an electrical wire and a sheet material having at least one electrical wire fixing part welded to an insulating covering of the electrical wire disposed on a main surface, and including a welding region part where the electrical wire and the sheet material are welded and a terminal side region part located closer to a side of a terminal part in relation to the welding region part; and
    a fixing member attached to the wire harness and fixed to a vehicle, thereby fixing the wire harness to the vehicle, wherein
    when bending force is applied to the terminal side region part in a state where the fixing member is fixed to a fixed object,
    the welding region part includes a first region part following a bending of the terminal side region part and a second region part linked to an opposite side of the first region part from the terminal side region part and prevented from following the bending of the terminal side region part by support force of the fixing member.

2. The fixing member-attached wire harness according to claim 1, wherein
    when the electrical wire fixing parts in the first region part and the second region part in the sheet member are defined as a first electrical wire fixing part and a second electrical wire fixing part, respectively, and
    the fixing member is provided on a lateral extension part extending to a lateral side of the electrical wire from the second electrical wire fixing part or the second electrical wire fixing part in the sheet material.

3. The fixing member-attached wire harness according to claim 1, wherein
    when the electrical wire fixing parts in the first region part and the second region part in the sheet member are defined as a first electrical wire fixing part and a second electrical wire fixing part, respectively,
    the fixing member is provided on a front extension part extending to a front side from the second electrical wire fixing part in the sheet material.

4. The fixing member-attached wire harness according to claim 3, wherein
- the front extension part extends to be linked to a lateral side of the first electrical wire fixing part on a front side of a lateral extension part extending to a lateral side of the second electrical wire fixing part in the sheet material, and
- a perforated line is formed at a boundary between the front extension part and the first electrical wire fixing part.

5. The fixing member-attached wire harness according to claim 1, wherein
- in the welding region part, a plurality of spot welding parts where the insulating covering and the sheet material are partially welded are formed at intervals along an extension direction the electrical wire.

6. The fixing member-attached wire harness according to claim 1, wherein
- in the welding region part, the insulating covering and the sheet material are continuously welded along an extension direction of the electrical wire.

\* \* \* \* \*

UNITED STATES PATENT AND TRADEMARK OFFICE
CERTIFICATE OF CORRECTION

PATENT NO. : 11,170,914 B2
APPLICATION NO. : 16/981490
DATED : November 9, 2021
INVENTOR(S) : Mizuno et al.

It is certified that error appears in the above-identified patent and that said Letters Patent is hereby corrected as shown below:

In the Claims

At Column 13, Line 16 (Claim 5), please change "direction the" to -- direction of the --.

Signed and Sealed this
Thirty-first Day of May, 2022

Katherine Kelly Vidal
*Director of the United States Patent and Trademark Office*